No. 870,568. PATENTED NOV. 12, 1907.
G. M. LUDLOW.
CHART FOR COMPUTING SCALES.
APPLICATION FILED APR. 4, 1907.

3 SHEETS—SHEET 1.

No. 870,568.
PATENTED NOV. 12, 1907.
G. M. LUDLOW.
CHART FOR COMPUTING SCALES.
APPLICATION FILED APR. 4, 1907.
3 SHEETS—SHEET 2.
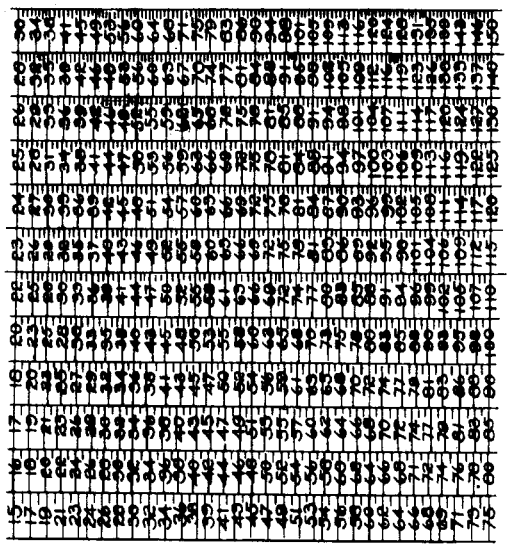
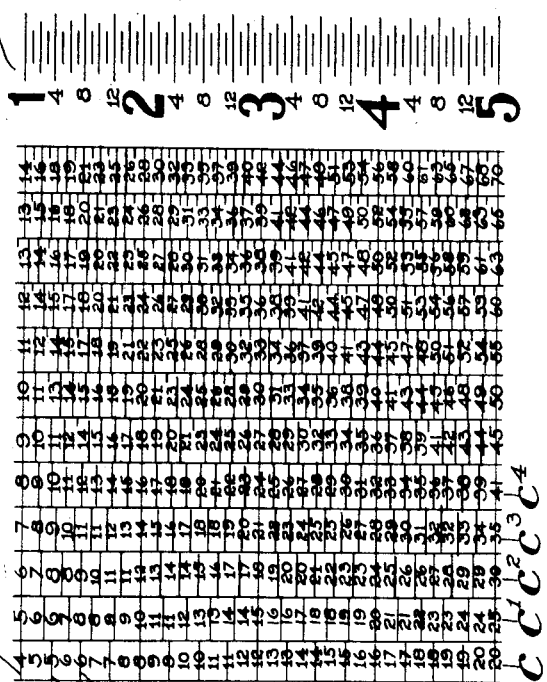
Fig. 2.
WITNESSES
W. H. Christman
Chas. J. Welch
INVENTOR.
George M. Ludlow
BY
ATTORNEYS.

No. 870,568.
PATENTED NOV. 12, 1907.
G. M. LUDLOW.
CHART FOR COMPUTING SCALES.
APPLICATION FILED APR. 4, 1907.
3 SHEETS—SHEET 3.

Witnesses
W. H. Christman
Chas. J. Welch

Inventor
George M. Ludlow
By
Bowman
Attorney

UNITED STATES PATENT OFFICE.

GEORGE M. LUDLOW, OF CHICAGO, ILLINOIS, ASSIGNOR TO THE COMPUTING SCALE COMPANY, OF DAYTON, OHIO, A CORPORATION OF OHIO.

CHART FOR COMPUTING-SCALES.

No. 870,568.  Specification of Letters Patent.  Patented Nov. 12, 1907.

Application filed April 4, 1907. Serial No. 366,400.

*To all whom it may concern:*

Be it known that I, GEORGE M. LUDLOW, a citizen of the United States, residing at Chicago, in the county of Cook and State of Illinois, have invented certain new and useful Improvements in Charts for Computing-Scales, of which the following is a specification.

My invention relates to improvements in charts for price scales, sometimes called computing scales, and the object of the invention is to provide a scale by means of which all the commercial transactions can be commercially and accurately indicated The nature and object of the invention and the invention itself will fully appear from the following description and the claims, reference being had to the accompanying drawings, in which—

Figure 1:
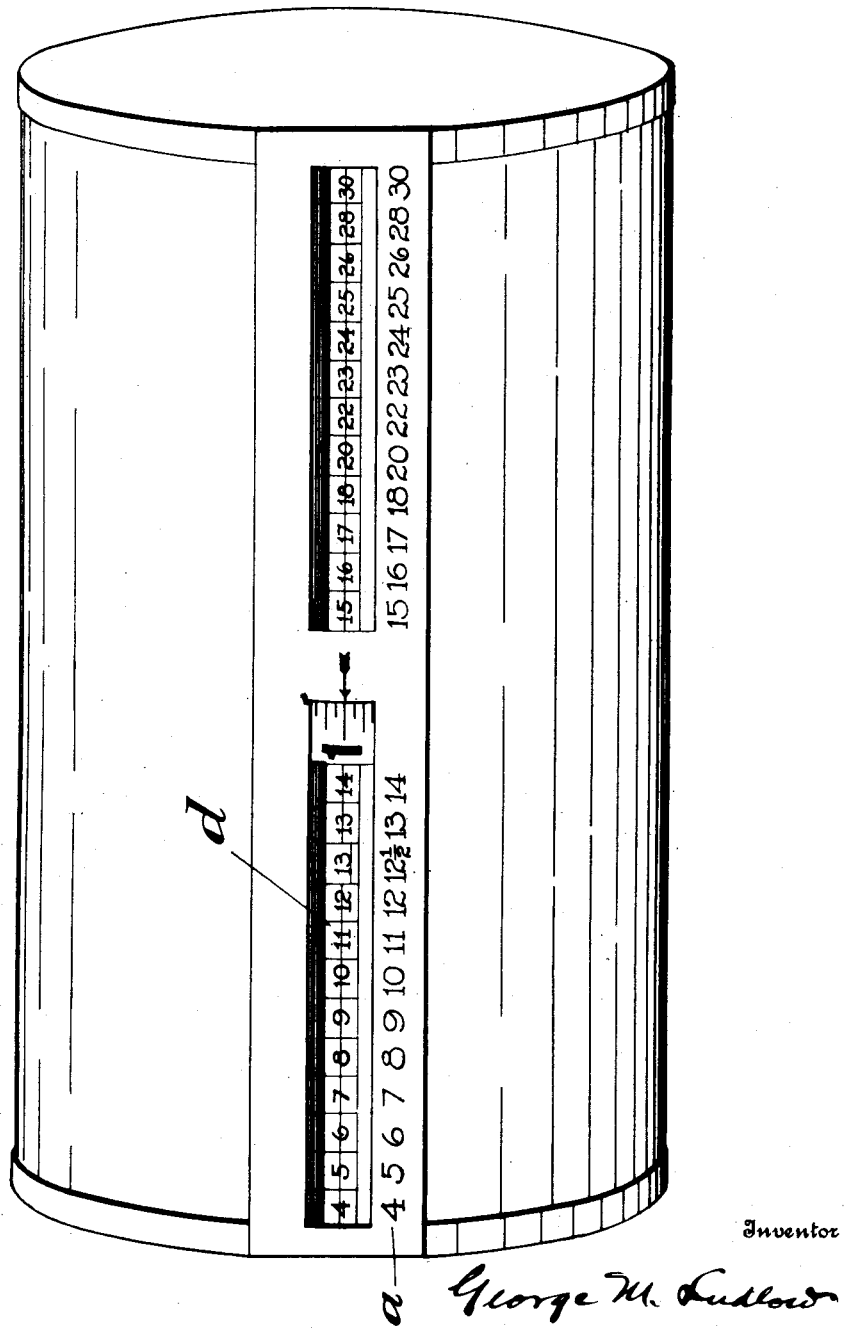
Figure 3:
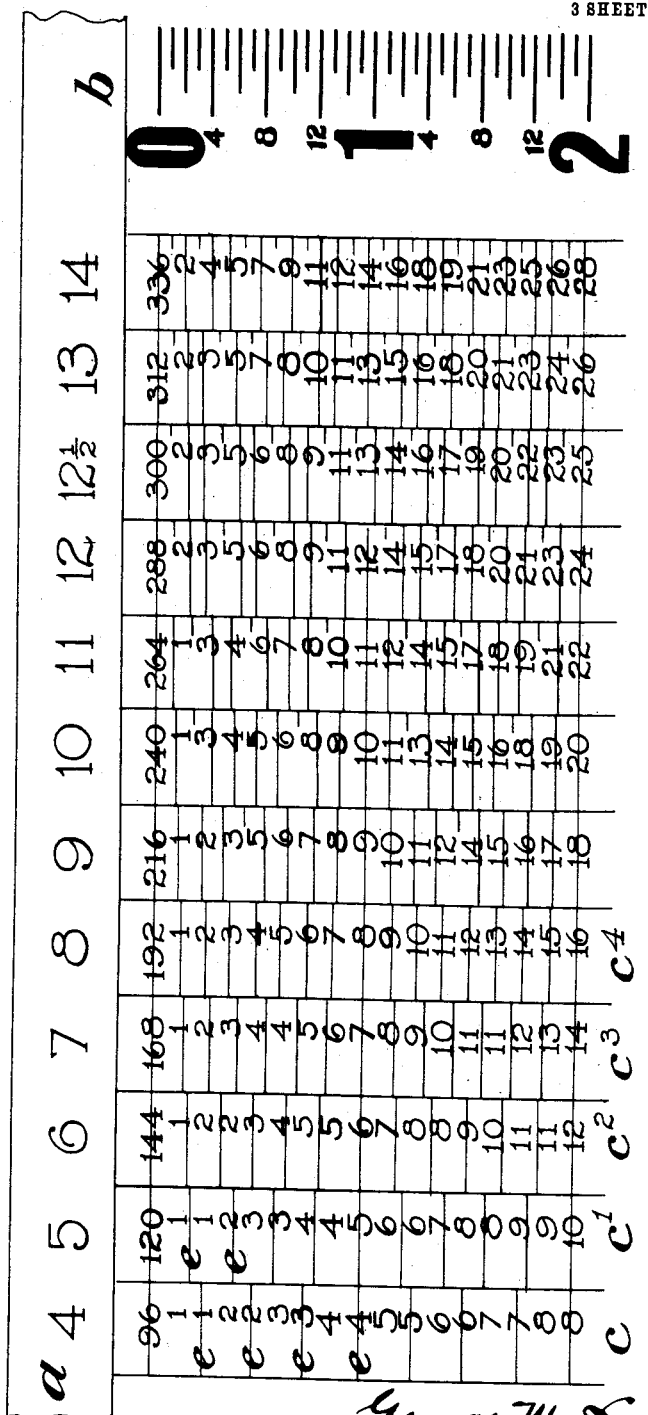

Figure 1 is a view in perspective of an indicator in the form of a drum to which I have shown my chart applied. Fig. 2 is a view of a part of the chart itself showing the arrangement of the value computations for specific weights based upon the commercial value as well as for numerical fractions of the unit of weight (regardless of specific weights) based on the division of the unit into as many parts as there are units in value in the price per unit of weight. Fig. 3 is an enlarged view of a section of the same.

In price or computing scales, the object of course is to provide a device which will give to the user an indication at once of the commercial value of the article being sold when a certain definite article is placed upon the scale. In other words, the scale should indicate exactly what the operator should charge if mental or mathematical computations were made by multiplying the exact weight of the article by the price per pound. It is obvious that in such a system the total of the computations must conform to the monetary system which applies to the transaction, and in this case the fractions of a unit in the monetary system must be discarded; as applied to the United States currency the fractions below one-half cent are given to the purchaser and those of one-half cent or above are taken by the seller. This is the ordinary commercial transaction, and scales based upon this system are arranged to perform the same function. In cases, however, where the transaction is reversed and where the purchaser desires the actual value of a certain definite amount of money, then the transaction should show the mathematical or money division value and not the commercial value. In the first of these systems for each fraction of a pound that would be called for in the regular course of business, there is placed a figure representing the commercial value of that particular weight. It is obvious that in this method where the price per pound is small a number of fractions in a pound will indicate exactly the same value For instance, the price being 2 cents a pound, any fraction of a pound up to three-quarters of a pound would indicate 1 cent, and anything over three-quarters of a pound and up to one pound would indicate 2 cents, this being the commercial value. If, however, upon a chart of this kind, a purchaser asks for the value of 1 cent, and the operator should place upon the scale an amount sufficient to show the first indication of 1 cent it is obvious that the purchaser would not get all he is entitled to It is apparent that this is an extreme case, but it shows some of the difficulties that have occurred where scales of this character are provided with charts having the commercial value of each ounce or other fraction of a pound placed opposite that particular weight indication upon the chart. These charts have generally been used on that class of scales such as butchers' scales, or grocery scales in stores where pounds and ounces are called for, in which the transactions are almost always the selling of a certain definite size or weight of commodity at the commercial value thereof.

In scales that deal in commodities which are finally sub-divided, like coffee, sugar, cereals in bulk, and things of this character where small amounts of goods are sometimes called for by money's worth, such as 10 cents, 25 cents or 50 cents worth of an article, then it becomes desirable to make the chart indications or divisions for each pound correspond to the number of monetary units in the price-per-pound. In this case, when the price was but 2 cents a pound, there would be but two divisions on the chart in that section of the chart representing pounds, one being at the half pound and one at the full pound. In a case where the price was 4 cents per pound, there would be four divisions, one at each fourth of a pound. At 16 cents per pound there would be sixteen divisions, or one opposite each ounce.

To provide a chart which when applied to a scale will give all of these transactions has been the object of this invention.

In Fig. 1 I have shown simply a computing device utilizing my improved chart. This is the ordinary drum which is adapted to be turned by the weight placed upon the platform or receiver. In the drawings this chart is shown turned to one pound. The arrangement of the chart is perhaps best shown in Fig. 3, in which at the top, at $a$, is shown a row of prices per pound. At the extreme right, under $b$, is shown the graduations in pounds and ounces. Under each price per pound, at $a$, is shown (as at $c^1$, $c$, $c^2$, $c^3$, $c^4$, etc.) the column of figures and indications representing the commercial and actual value and any weight of commodity at the given price per pound at the head of that column. For convenience, the commercial values are placed at every two ounces, this being the unit of weight for this particular scale, so that when the chart is moved by the weight upon the scale to a point where it will indicate two ounces, the commercial value of this commodity at the particular price per pound is immediately indicated on the chart, it being understood that this chart will move to an indicating line on the opening of the outer case, as represented at *d* in Fig. 1. In addition to these figures representing commercial values, it will be seen that in each column there are a series of graduations represented by the lines, *e*, a part only of these lines being lettered to avoid confusion.

It will be seen that while the commercial value is placed opposite each two ounces the actual value is indicated by the lines which cut one of these commercial values. The lines indicating the actual mathematical value and the figures indicating the commercial value are arranged according to an entirely different system, as set forth above; that is to say, the commercial value is placed opposite the particular division of the ordinary pound and ounce system, while the mathematical or money division value indication is obtained by dividing the space of one pound into as many units or divisions as there are money units in that particular price per pound. To make this clear, it will be seen that under the price "4" in the row, *a*, of prices, there will be found two 1's, two 2's, two 3's, two 4's, which represent the commercial value of any two ounces as indicated on the weight chart, *b*, while there are four divisional lines or divisions, each of which represents the true or exact weight of any multiple of the monetary unit. For instance, the first line cutting the Fig. 1 indicates the exact weight of one cent's worth; the next line cutting the figure 2 would indicate the weight representing two cents' worth and so on. In every case, except where the price includes a fraction of a monetary unit such as 12½, it will be found that the lines opposite the pound indication correspond exactly and cut through the center of the commercial value. In the case of a fraction, for instance as in 12½, while 13 is given as the commercial value of the pound, the true value or weight represented by 13 monetary units is shown cutting the edge of the 13. From this we derive the foundation principle of this improved chart, and that is that it combines in each price column a series of figures placed opposite the ordinary pound and ounce division in connection with a series of other indications which represent the division of this pound into units corresponding to the number of monetary units in the price per pound, which gives us a chart which at once complies with all the trade conditions and enables the operator to at once determine the commercial value with absolute certainty by reading the figure which is exposed and also to give the customer the exact monetary value by bringing the scale to balance over the line or other indication which is nearest to said figure. For convenience in distinguishing these different indications, I preferably print the figures in one color and the indications representing the actual value in a different color; for instance, the figures are generally printed in black and the lines indicating the number of monetary units in each pound are printed in red, so that the two systems are readily distinguished one from the other.

Having thus described my invention, I claim:

1. In a chart for computing or price scales, a series of graduations indicating pounds and ounces, a series of columns of figures, one figure in each column placed opposite a certain division of said pounds and ounces representing the commercial value of any article at a certain price per pound, of a weight indication opposite said figure, in combination with a series of indications in each of said columns representing the number of monetary units in the given price per pound contained in the space occupied by the pound and ounce graduations.

2. In a chart for computing or price scales, a series of prices, a series of columns of figures adjacent to said prices, one column for each price, said columns of figures representing the commercial value of different weights at the price corresponding to said column, in combination with a series of indications in the same columns representing the number of divisions of the weight unit corresponding to the number of units of value contained in the price per unit of value, as and for the purpose specified.

3. In a chart for price or computing scales, pound and ounce graduations, a series of figures representing prices per pound, a series of columns of figures adjacent to said price, one column for each price, said figures representing the commercial value of pounds and divisions thereof and placed opposite to said divisions, each of said columns being also provided with a series of indications for each pound corresponding to the number of monetary units contained in the price per pound.

4. In a chart for computing or price scales, a series of divisions representing weights, a series of columns of figures representing values parallel to said divisions of weight, said figures in each column being arranged opposite to the division of weight, a series of prices representing the number of monetary units in a unit of weight, said price figures being arranged adjacent to said columns, one price figure for each column, the figures in said columns representing the commercial value of the different divisions of weight opposite to which they are placed at the price adjacent to said column, and a series of indications in each of said columns representing the division of the weight unit into as many parts as there are monetary units in the price adjacent to said column.

5. In a chart for computing or price scales, a series of graduations representing pounds and ounces or other units of weights, a series of figures placed opposite said graduations indicating the commercial value of any weight unit or fraction thereof, and a series of indications representing values determined by dividing the unit of weight by the number of monetary units in the particular price per pound, said commercial value and said actual values being printed in different colors, in combination with a series of prices adapted to stand opposite each of said series of computations, substantially as specified.

6. In a chart for computing or price scales, a series of graduations representing units of weight, a series of figures placed opposite said graduations indicating the commercial value of any weight unit or fraction thereof, and a series of indications representing values determined by dividing the unit of weight by the number of monetary units in the price per unit, in combination with a series of prices adapted to stand opposite each of said series of computations, substantially as specified.

In testimony whereof, I have hereunto set my hand this 20th day of March, 1907.

GEORGE M. LUDLOW.

Witnesses:
N. A. MOORE,
E. MANSKE.